United States Patent [19]

Shearman

[11] 3,731,005

[45] May 1, 1973

[54] LAMINATED COIL

[75] Inventor: Paul M. Shearman, Plainville, Mass.

[73] Assignee: Metalized Ceramics Corporation, Providence, R.I.

[22] Filed: May 18, 1971

[21] Appl. No.: 144,609

[52] U.S. Cl.......179/100.2 C, 317/101 CM, 336/200, 340/174.1 F

[51] Int. Cl...............................G11b 5/20, H01f 5/00

[58] Field of Search................................29/602, 603; 179/100.2 C; 317/101 CM; 336/200; 340/174.1 F; 346/74 MC

[56] References Cited

UNITED STATES PATENTS

| | | | |
|---|---|---|---|
| 3,189,978 | 6/1965 | Stetson | 317/101 CM |
| 3,456,158 | 7/1969 | Davis, Jr. et al. | 317/101 |
| 3,614,554 | 10/1971 | Richardson et al. | 336/200 |
| 3,561,110 | 2/1971 | Feulner et al. | 317/101 CM |

*Primary Examiner*—J. Russell Goudeau
*Attorney*—Kenway, Jenney & Hildreth

[57] ABSTRACT

A coil having a core and method of fabricating that coil by forming layers of green ceramic, forming openings and depositing metal in predetermined patterns in and through the layers, assembling the layers with the metalized patterns so arranged as to form three-dimensional conductive paths, and firing the green ceramic layers simultaneously to bond the metal to the ceramic and to vitrify the ceramic. The openings may be formed by mechanical means or the layers may be discontinuous and staggered relative to each other to form the openings for the insertion of the core or cores about which the three-dimensional paths form coils.

15 Claims, 7 Drawing Figures

Figure 1:
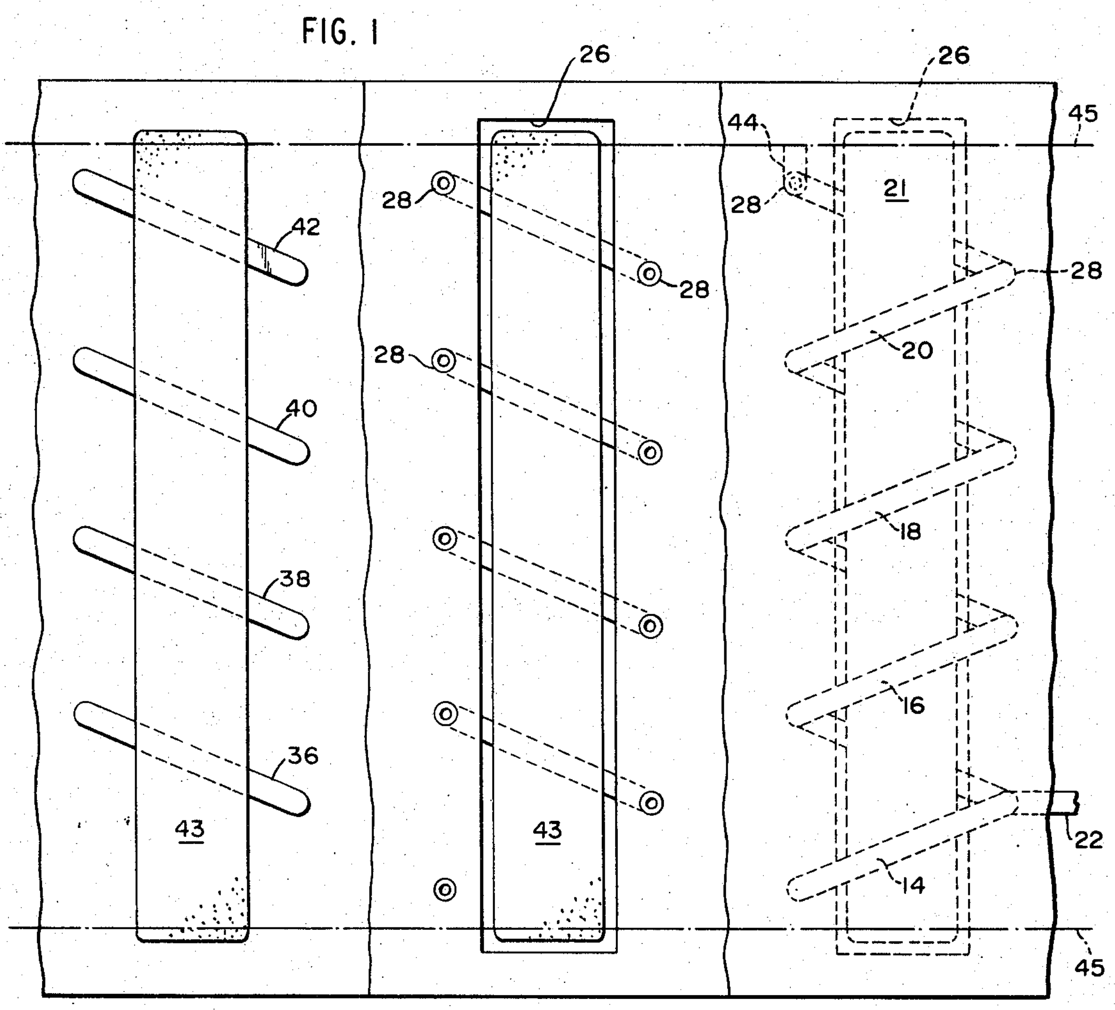

INVENTOR
PAUL M. SHEARMAN
BY Kenway, Jenney & Hildreth

ATTORNEYS

INVENTOR
PAUL M. SHEARMAN
BY Kenway, Jenney & Hildreth
ATTORNEYS

INVENTOR
PAUL M. SHEARMAN

BY Kenway, Jenney & Hildreth

ATTORNEYS

LAMINATED COIL

This invention relates in general to laminated coils and in particular to such coils as incorporated in magnetic transducers.

Magnetic recording systems are well known and their use is expanding tremendously with the growth of various technologies, particularly those related to the computer field. Currently, the most common data storage system utilizes a magnetic medium of one type or another. The medium may take the form of magnetic discs, magnetic drums, magnetic tapes, magnetic wires or any other magnetic elements which are capable of accepting and storing data at high density in a small volume. Obviously, whatever magnetic medium is used, some form of transducer is necessary to impart information to the medium and to retrieve that information when it is needed.

A variety of transducers have been developed in parallel with the development of magnetic storage systems. Practically all such transducers have one feature in common, however. That is, each has a magnetic element generally in the form of a core about which windings are arranged, signals to be imparted to, or derived from, the magnetic medium being handled by the windings.

One of the more commonly used memory systems for data storage is the so-called magnetic disc. Data is written on and read from the disc by magnetic transducers which are fixed in positions precisely aligned to a track on the disc. Of course, the position of the transducing head must also be precisely maintained relative to the track when data is being written or read as the disc moves relative to the magnetic transducing head. Much work has been done to achieve and maintain precise positioning and that work has become increasingly difficult as data is packed more and more densely and the tracks on the disc are correspondingly more closely spaced. These same considerations hold for other types of magnetic storage mediums, but the disc is emphasized here because of its predominance in the data storage field.

The scheme of fabricating transducing heads by inserting cores through layered or laminated ceramic material on which a turn or two of the necessary coils have been formed by the deposition of fine metallic lines on the surface of each layer or lamination is not basically novel. To join the lines on the various layers, holes formed through the layers, and known in the art as "vias," are also metalized to permit interconnection of coil elements from one layer to the next. If the coils are to have cores, as is usual, it is the practice to punch relatively large openings within the confines of the coil traced on each layer and the core may then be inserted through the stacked layers.

One of the more convenient methods of fabricating such laminated coils begins with what is known in the trade as "metalizing in the green." Briefly, that process involves casting a slip of ceramic tape in the green or unfired state, punching any necessary apertures and guide marks in the tape, metalizing the surfaces and openings in the tape as needed to form coil elements, assembling as many layers as are needed for the final product, and firing the assembly at high temperature simultaneously to bond the metal to the ceramic and form the layers of ceramic into an integral vitrified device. Such devices have achieved considerable success because they do indeed contribute to the miniaturization and improvement of equipment for data storage. However, various factors such as tape shrinkage tolerances, metal line and line spacing tolerances and piercing tool clearances are such that the minimum spacing that can be obtained between inductors is approximately 0.030 of an inch. Such a spacing is excessive in view of the fact that the tracks to be located and followed by the transducers on data storage discs can be, and frequently are, spaced apart by only 0.012 of an inch or less. This has led to the use of multiple pickup head structures, one staggered behind another, in order that the closely spaced tracks can be scanned or followed by a transducer head. Such multiple head per track structures tend to be clumsy and inefficient, especially in those applications where high speed access to the data is needed and where the data is densely packed. Among the several objects of the present invention is the elimination of large assemblies of multiple staggered reading heads and the inclusion of a plurality of heads in a single light-weight unit capable of scanning recording tracks which are spaced apart by as little as a few thousandths of an inch. Other objects include the reduction of cross-talk between adjacent pickup heads, the simplification of mechanical scanning structure, and the reduction of overall cost of data storage systems.

SUMMARY OF THE INVENTION

The present invention is concerned with a coil structure and methods of fabricating that coil which, like the more recent prior art discussed above, involves the "-metalizing in the green" process. The technique further involves the metalization of surfaces of the layers, but, unlike the prior art processes, only fractions of turns of what ultimately will become a coil are formed in or through a layer. By making the layers discontinuous, that is, by forming any given layer out of several separate lengths of tape, openings or gaps in an assembly of such layers may be provided. It is desirable to stagger the lengths of tape, and accordingly the openings, in an assembly in order that the openings be only one layer in width. The patterns of metal laid down, or screened upon, the layers are disposed about the openings upon adjacent layers and may pass through the layer in which the opening is formed to create a three-dimensional electrically conductive path which constitutes a coil. The opening may then receive a suitable core member, such as a ferrite to complete the coil and core assembly.

In a variation of the invention, fractions of turns of a coil are formed by metalizing a surface of one layer, relatively large openings bordered by small apertures are punched in a second layer, other fractions of turns of the coil are formed on a face of a third layer and the small apertures are metalized. The three layers are assembled together, side portions of the second layer are broken away to expose the ends of the large openings and the assembly is fired to bond the metal to the ceramic and to convert the assembly into an integral body. Cores may then be inserted into the large openings in planes parallel to the layers. Alternatively, those layers which are designed to accommodate subsequently inserted cores may be screened upon others of the layers at spaced intervals, the intervals constituting the necessary core receptacles. In modifications of the process, staggering or shielding of the coils to prevent cross-talk between transducers and to accomplish other electrical improvements is possible.

Figure 2:
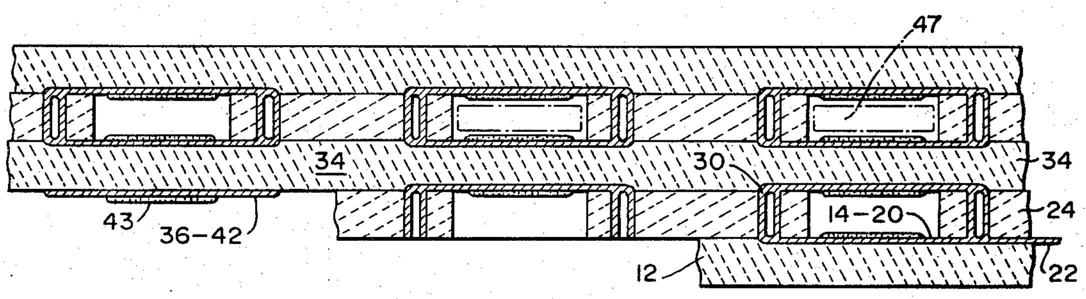
Figures 3, 4:
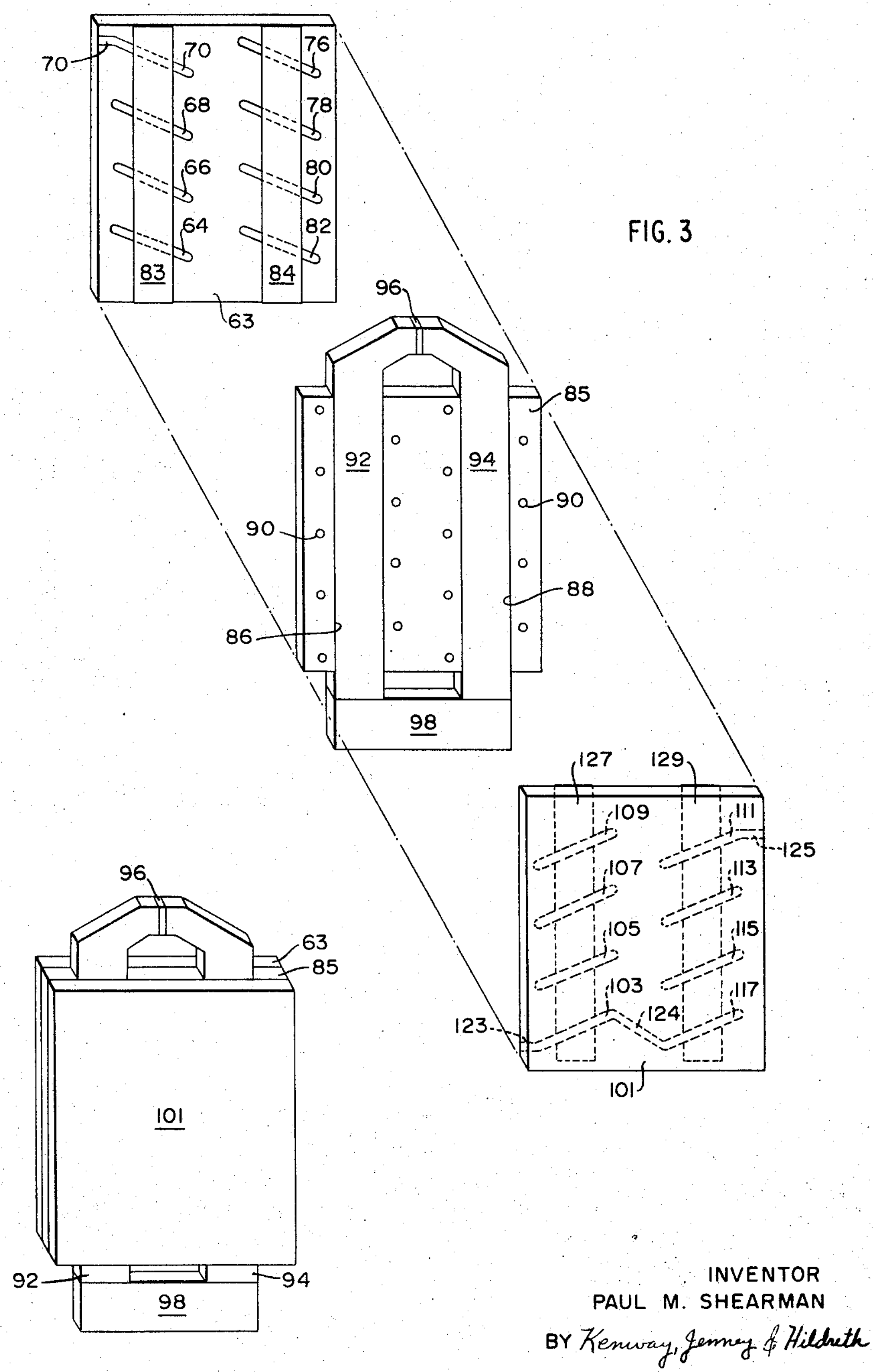
Figure 5:
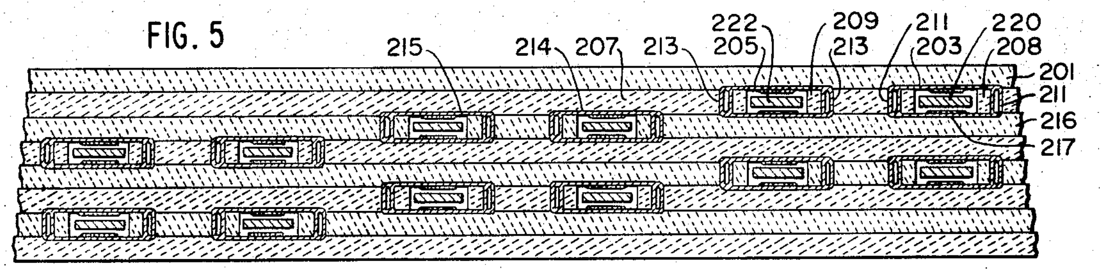
Figure 6:
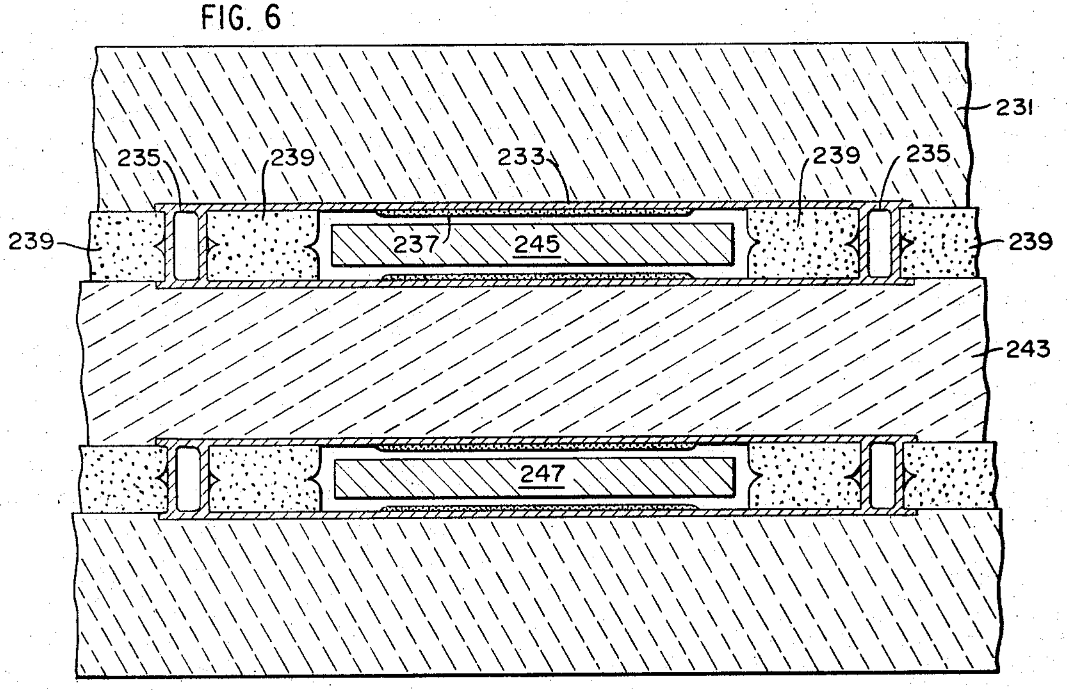
Figure 7:
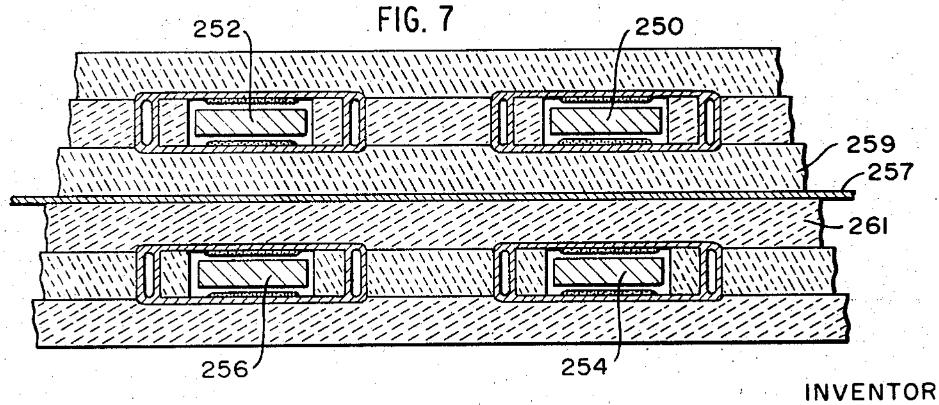

For a better understanding of the present invention, together with other and further objects, features and advantages, reference should be made to the following description of preferred processes and devices made in accordance with the present invention which includes a drawing in which:

FIG. 1 is a front elevation of a plurality of layers of ceramic tape so assembled as to show processing details, FIG. 2 is a fragmentary side view of the tape layers of FIG. 1, partially broken away to show details of the process and device, FIG. 3 is an exploded view of a completed device showing the interrelation of the various layers and coil elements, FIG. 4 is an assembly of the elements of FIG. 3, FIG. 5 is a side view similar in some degree to the showing of FIG. 2, but incorporating different process details, and FIG. 6 is an enlarged fragmentary view similar to FIG. 2, but incorporating details of another process, FIG. 7 is a view of a shielded unit.

The layers of tape shown in FIGS. 1 and 2 are produced by milling bulk alumina with resins, plasticizers and solvents to produce a suspension or slip which is poured upon a support film and drawn beneath a metal blade set in height to define the thickness of tape. Controlled removal of volatiles leaves the tape in a flexible condition in which it can be slit, punched, machined or formed. Also, at this time, metal, ceramic, or both may be screened upon the tape in any desired patterns. The metal may be tungsten or molybdenum either in the pure or doped state suspended in an ink. Other metals in semi-fluid states are also capable of use.

As FIGS. 1 and 2 suggest, many layers of metalized tape may be incorporated in any given unit. In that fashion, as explained below, a large number of transducer heads can be incorporated in a compact body. Also, specific patterns of metalization are shown in FIGS. 1 and 2, but any patterns which can be joined together to form a three-dimensional conductive path constituting a coil are suitable.

Specifically, however, in FIGS. 1 and 2, a layer 12 is the first and outermost layer and parallel lines of metal 14 through 20 are screened upon that layer. Over those line, when needed, there may be screened an insulating or dielectric layer 21 which may be composed basically of the same material as the tape layers themselves, but with a variation in the proportion of binders, plasticizers and solvents in order that it may be applied in a semi-fluid form by a screening process. The layer 12, because it is the outermost layer, is metalized only upon its interior face. Also, a line of metal forming a tap 22 for electrical connection may also be formed in the metal screening process.

A second layer 24 lies against the layer 12 and, prior to its assembly with the layer 12, is passed through a punch press in which the large openings 26 bordered by apertures 28 are formed. Each of the apertures 28 is either filled or has its walls coated with the same metal material as that of the screened lines, for example, by drawing that metal material through the apertures. Although a coating 30 is shown upon the walls of the apertures 28, the apertures could equally well be solidly filled with metal.

A third layer of tape 34 has both of its surfaces metalized, although for purposes of understanding the structure of one coil, the lower surface as seen at the left of FIG. 2 need only be considered. Again, as in the case of the layer 12, parallel lines of metal 36 through 42 and, if desired, a tap line 44 are deposited upon the lower surface or face of the layer 34 and a layer of insulating material 43 is screened over the metal lines. As is most clearly seen at the right of FIG. 1, when the layers are joined, a continuous three-dimensional electrically conductive path is formed from the line 14 through an aperture 28 along a line 36, and so on, through and terminating at the aperture 28 to which the tap 44 is connected. Taps can, of course, be incorporated in the structure at a variety of points, if needed. The tap 44 is shown as representative.

When the multiple layers have been assembled, the sides of the layers may be cut off along the lines 45. These cuts expose the ends of the openings 26 permitting the later insertion of ferrites 47. Of course, such insertion is not made until after the assembled layers are fired to bond the metal to the ceramic layers and to vitrify the ceramic itself. The ferrites, when they are inserted, are insulated from the various lines by the insulating layers of which layers 21 and 43 are typical. It will be noted that the arrays of lines in the central portion of FIG. 1 are somewhat offset from the lines of the other showings. Such offsetting is not necessary but may be helpful in processing and is of some assistance in preventing cross-talk in the finally assembled units.

As indicated above, the primary utility of the present invention is believed to be in connection with magnetic transducer heads. However, there are situations in which a solenoid made in accordance with the present invention may be of value. Obviously, such solenoids could be made in the manner described with reference to FIG. 1. As will appear hereinafter, solenoids as well as transducers may also be made by other variations of the technique of the present invention.

FIG. 3 is an exploded view of a somewhat idealized version of the invention in that only a single transducer head is shown. To avoid complication of the drawing and to facilitate understanding of the invention, the single magnetic transducer head is shown in an exploded view in FIG. 3 and in an assembled view in FIG. 4. Although there may be situations wherein such a single head would be of use, it is anticipated that assemblies of a number of such heads in a single unitary monolithic structure will be more practical.

In any event, there is illustrated a layer of tape 63, prepared as described above, upon which parallel lines of metal have been deposited in two groups. The lines 64 though 70 constitute the first group and a tap 72 may be formed by the same process to permit electrical connection to the end of the line 70. A second group of lines 76 through 82 is also deposited upon the layer 63. Also, insulating layers 83 and 84 of semi-fluid ceramic tape material may be screened over the lines. A second tape layer 85, processed in the manner described in FIG. 1, or by one of the methods described hereinafter, includes relatively large openings or discontinuities 86 and 88, both large openings being bordered by relatively small apertures 90 which are punched through the tape. Again, as in the case of FIGS. 1 and 2 the apertures 90 are also metalized. Disposed in the openings 86 and 88 are two legs 92 and 94 of a magnetic member such as a ferrite. The magnetic member is generally L-shaped and the ends of the member adjacent the top approach each other to form a gap 96. The gap is filled with some non-magnetic material such as a glass frit to maintain the dimensions of the gap. At the bottom of the magnetic member and joining the legs 92 and 94 is a detachable bridge member of magnetic material 98. Of course other ferrite configurations such as the so-called C–I combination may be used to minimize gaps which may be lossy.

A third layer of tape 101 is treated in a manner similar to the structure of the layer 63. However, groups of metallic lines 103 through 109 and 111 through 117 are deposited in such a pattern that their angle to the vertical axis of the layer is negative as compared to the positive angle of the lines 64 through 70 and 76 through 84. A metallic bridge line 124 and electrical taps 123 and 125 may be provided if desired by the same metalizing process as that used to deposit the various lines. Also, insulating material is screened over the lines of metal in the manner described above to form the insulating bands or stripes 127 and 129. Just as in the case of the showing of FIGS. 1 and 2, the device of FIG. 3 need not have the precise disposition of metallic lines that is shown. What is required is a pattern of lines which when joined through the layer which includes the legs 92 and 94 of the magnetic member will form a three-dimensional electrically conductive path; in other words, a coil about each leg of the magnetic member.

FIG. 5 illustrates still another embodiment of the invention wherein close spacing of transducer heads as well as a minimum cross-talk between heads are achieved. Again, the structure consists of a number of layers of ceramic material joined together in parallel planar relationship. In fact, eight such layers are shown, but any reasonable number of layers may be integrated into a monolithic structure. Considering as the first layer the uppermost layer 201, the outer face of the layer is plain and the inner face has deposited upon it groups of lines of metal, the groups 203 and 205 being typical. A second layer 207 is discontinuous at spaced intervals or punched to form openings 208 and 209. The opening 208 is framed by a pattern of apertures 211 and the opening 209 is framed by a pattern of apertures 213. The pattern of the apertures in both cases may be the same as that previously described in that they cooperate with and are in electrical contact with ends of the lines 203 and 205. In this embodiment of the invention, however, the second layer 207 serves a dual purpose in that on its inner face it carries a group of lines of deposited metal 214 similar to the groups 203 and 205 but spaced along the layer and upon the opposite face as compared to the groups of lines 203 and 205. Still another group of lines 215 is deposited at a point further along the layer 207. On the upper face of a third layer 216 a group of lines 217 is formed in a predetermined pattern to cooperate with the conductive material in the apertures 211 and the group of lines 203 to form a three-dimensional electrically conductive path which forms a complete coil about the opening 208. Within the opening 208 there is disposed a core such as the ferrite 220 insulated at both of its sides from the lines of metal 203 and 217 by means of bands or stripes of ceramic insulating material similar to those previously described. A second ferrite 222 is similarly disposed in the opening 209 and these ferrites may constitute the legs of a transducer such as shown herein above.

Each adjacent pair of openings in each layer may contain similar ferrite transducer legs permitting the incorporation of a relatively large number of transducer heads in each integral body. The layers may be as thin as 0.005 of an inch permitting the heads to cooperate with data tracks spaced as closely as 0.005 of an inch apart upon a magnetic medium. The staggered or stepped arrangement of the transducer heads reduces cross-talk between the transducer heads to a minimum.

FIG. 6 illustrates still another approach to the problem of reading and writing data upon closely spaced tracks on a magnetic medium. What is shown in FIG. 6 is an enlarged fragmentary view of transducers made in accordance with the teaching of the present invention. In this case, a layer of ceramic material 231 which may be as thin as the previously described layers; that is, 0.005 of an inch or thinner, is shown as the top or outermost layer of the structure. The layer may be originally prepared generally in the same fashion as the layers described above. However, lines of metal 233 are first screened upon what will become the inner face of the outermost layer. Following the deposition of the metal, dielectric material is screened over the metal in a thin and relatively narrow layer 237. A somewhat thicker layer 239 of ceramic material is then screened across the entire surface to leave large central openings bordered by apertures similar to those previously described. The plateaus of ceramic material 239 deposited upon the layer 231 form, in effect, half of a discontinuous spacer layer between major layers, and a mask to permit the following step which is the deposition of metal 235 in the apertures of the plateau.

A further major layer 243, similar to the layer 231 is treated in the same fashion as the layer 231 to form similar metallic bonds, dielectric plateaus and aperture fills. Similarly, as many layers as are needed to provide additional transducer heads throughout the width of the structure are prepared. The layers are joined and fired to properly sinter the metal to the ceramic layers and to join the metal fills from one layer to the next as the ceramic vitrified. Finally, cores such as the ferrites 245 and 247 are inserted in the openings or voids which remain between the screened dielectric layers. It is possible to achieve openings as thin as 0.002 of an inch, although a limit is encountered based upon the state of the art in forming ferrite cores or transducer legs.

Finally, in FIG. 7, an embodiment of the invention is shown in which relatively complete shielding is achieved between transducers. Assuming that the ferrites 250 and 252 constitute the legs of a given magnetic transducer and the ferrites 254 and 256 constitute the legs of a second transducers, a full layer of metal 257 may be deposited upon either of the ceramic layers 259 or 261 in order to isolate and shield the two transducers one from the other. At the same time the metal layers such as the layer 257 are deposited, suitable lines of metal may be deposited to serve as taps to permit electrical grounding of the shields. As in the previously described processes, the sintering of the metal shield 257 and taps may take place at the same moment as the sintering of the other conductive metal elements of the structure during the firing and vitrification of the ceramic materials.

I claim:

1. In an inductive coil device which includes a plurality of layers of ceramic material joined together in parallel planar relationship, the combination of metal deposited in predetermined patterns in and upon said layers to form a continuous three-dimensional electrically conductive path, at least one of said layers being discontinuous adjacent said predetermined patterns to provide at least an opening through said one of said layers, and a core disposed in said opening and substantially surrounded by said three-dimensional electrically conductive path.

2. In an inductive coil device as defined in claim 1, the combination wherein said one of said layers is discontinuous to the extent that at least two openings through said one of said layers are provided, said core is formed with two parallel legs, said metal is deposited in similar predetermined patterns about each of said openings, and one leg of said core is disposed in each of said openings.

3. In an inductive coil device as defined in claim 1, the combination wherein each of said layers is discontinuous to provide at least an opening in each said layer, said discontinuities being formed at different points along the length of adjacent layers, said metal being deposited in said predetermined patterns about each of said openings, and a core is disposed in each said opening and substantially surrounded by a three-dimensional electrical conductive path.

4. In an inductive coil as defined in claim 2, the combination wherein each of said layers is discontinuous to provide at least an opening in each said layer, said discontinuities being formed at different points along the length of adjacent layers, said metal being deposited in said predetermined patterns about each of said openings, one leg of a given core being disposed in one opening formed in a given layer, the other leg of a given core being disposed in the other opening formed in a given layer.

5. In an inductive coil as defined in claim 1, the combination wherein a band of electrically insulating material is disposed in aid opening between each side of said core and the confronting face of the layer adjacent thereto.

6. In an inductive coil as defined in claim 2, the combination wherein a band of electrically insulating material is disposed in each of said openings between each side of one of said legs and the confronting face of the layer adjacent thereto.

7. A method of forming an inductive coil which comprises the steps of depositing in a first predetermined pattern lines of conductive material upon a face of a first ceramic layer, forming at least an opening and apertures disposed in a second predetermined pattern about said opening through a second layer of ceramic material, depositing conductive material within aid apertures, depositing lines of conductive material in a third predetermined pattern upon a face of a third layer of ceramic material, assembling said first, second and third layers together with an end of each of said lines in register and in electrical contact with the conductive material within one of said apertures, said predetermined patterns being such that a continuous three-dimensional electrically conductive path is traced through said layers to form a coil of conductive material about said opening, firing said assembled layers to form an integral body and to sinter said conductive material to said layers and inserting a core in said opening.

8. A method of forming an inductive coil which comprises the steps of forming layers of ceramic material, depositing a first predetermined pattern of lines of metallic material on a face of a first of said layers, depositing a second predetermined pattern of lines of metallic material on a face of a second of said layers, providing a third discontinuous layer of ceramic material having at least a relatively large opening and a plurality of relatively small apertures formed therethrough, said apertures being disposed in a third predetermined pattern related to said first and second predetermined pattern, depositing metallic material in said apertures, assembling said first and second layers together with said third discontinuous layer separating said first and second layers, said first, second and third predetermined patterns of metallic material forming a continuous, three-dimensional path about said opening, firing said assembled layers to form an integral body and to sinter said metallic material to said layers, and inserting a core in said opening.

9. A method as defined in claim 8 wherein said third discontinuous layer is formed by screening ceramic material upon said first and third layers prior to assembly thereof.

10. A method as defined in claim 8 wherein said third discontinuous layer is formed by punching said opening therein, said opening being less in width than said third layer, and subsequently breaking off the extremities of the width of said layer to expose the ends of said opening for the insertion of said core therein.

11. In a method of forming inductive coils from a plurality of layers of ceramic material, the steps of depositing metallic material in predetermined patterns on one face of each of two given layers, depositing metallic material in predetermined patterns on both faces of the remaining layers, forming openings and apertures bordering said openings in each of said remaining layers, depositing metal in said apertures, assembling said remaining layers with the openings of each layer stepped from the openings of adjacent layers, further assembling with said remaining layers said two given layers as the outermost layers, said one face of each of said two given layers abutting said assembly of remaining layers, said predetermined patterns of metallic material on said layers and said metallic material in said apertures forming a three-dimensional electrically conductive path about each of said openings, firing said assembled layers to form an integral body and to sinter said metallic material to said layers, and inserting a core member in each of said openings.

12. A transducer head comprising a plurality of layers of ceramic material formed into an integral body, certain of said layers having openings bordered by apertures formed therethrough, predetermined patterns of lines of metallic material being deposited upon faces of certain of said layers and metallic material being deposited in said apertures, said lines of metallic material and said metallic material in said apertures forming three-dimensional electrically conductive paths about said openings, and a core disposed in each of said openings, each said core lying in the plane of the layer of ceramic through which its associated opening is formed.

13. A transducer head as defined in claim 12 further including a band of insulating material disposed between each face of said core and the layer of ceramic material adjacent thereto.

14. A transducer head as defined in claim 12 further including a shield comprising a sheet of metallic material disposed between two adjacent layers of ceramic material.

15. In a transducer head comprising a plurality of layers of ceramic material formed into an integral body, the combination wherein the first and outermost layer at one face of said body is continuous and unbroken along its length, a first plurality of lines of conductive material being deposited upon the inner face of said first layer, the second layer being discontinuous and having relatively large gaps formed therein and relatively small apertures formed therethrough adjacent said gaps, conductive material being deposited within said relatively small apertures, each said small aperture being in register with an end of one of said first plurality of lines, the conductive material of said first plurality of lines and within said apertures being in electrical contact, the third of said layers also being continuous and unbroken along its length and having a second plurality of lines of conductive material deposited on the face thereof adjacent said second layer, an end of each of said second plurality of lines of conductive material being in register with one of said relatively small apertures, the conductive material of said second plurality of lines and within said apertures being in electrical contact whereby a continuous three-dimensional electrically conductive path is formed about each of said gaps, and a core member is disposed in each of said gaps.

* * * * *